April 1, 1930.  B. S. HARRISON  1,752,483
OVEN HEATING AND CIRCULATING SYSTEM
Filed July 6, 1928  3 Sheets-Sheet 1

INVENTOR.
Burt S. Harrison
BY
ATTORNEYS.

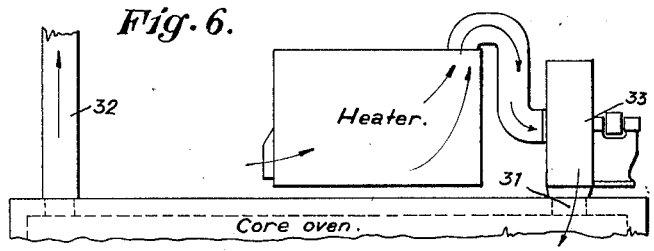
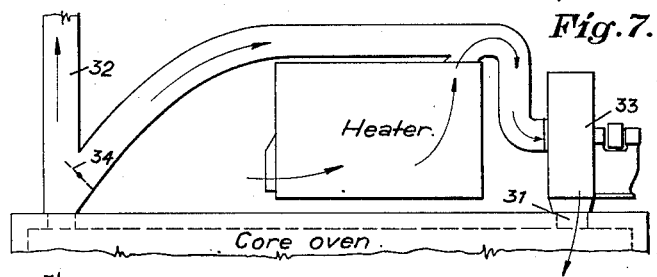
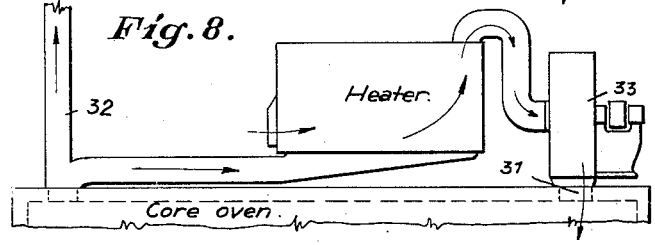
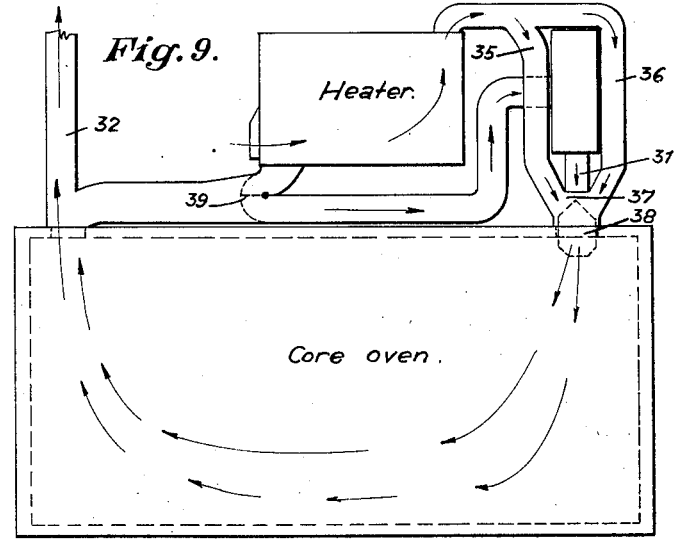

Patented Apr. 1, 1930

1,752,483

UNITED STATES PATENT OFFICE

BURT S. HARRISON, OF BROOKLYN, NEW YORK

OVEN HEATING AND CIRCULATING SYSTEM

Application filed July 6, 1928. Serial No. 290,842.

This invention relates to heating systems and more particularly to methods of and means for utilizing gases in the treatment of products requiring heating, drying, or other conditioning in a temperature controlled area.

The general object of the invention is to provide for the supply of a given quantity of heat at a predetermined rate, whereby temperature control will be more efficiently effected within an oven and the circulation of gases therein carried out with a minimum of loss and a maximum of desired application to the products treated.

Another object is to provide for the control and allocation of various gases within an oven so that varying temperatures may be set up and maintained within a heating area, and the course of the gases routed to establish different gas conditions at various points. It is further an object, however, to make the system sufficiently flexible so that a uniform temperature may be established, if desired, in a given area, whereby equable heating conditions will exist no matter the position therewithin of the product to be treated.

The control of temperature in an oven, or in any heating area, entails, in general, the problems of supply and distribution. As is usual, the supply is derived from fuel combustion. Applicant proposes utilizing the products of combustion to conserve fuel and obtain more efficient distribution by causing the products of combustion to produce currents of desired temperature adapted to effect movement in desired directions. Thus, the products of combustion may be used to supply heat directly to an oven and additionally to raise the temperature of an air supply or other medium used in the system. The routing of the products may consequently apportion the available heat for a plurality of uses, while, in combination with blowers or fans, produce different heating stages in the one area.

Where a substantially uniform condition is required, as in the baking of cores and the drying of moulds, the usual method, that of providing a combustion chamber at one end of the oven and driving the heat through the oven to an exhaust at the other end, fails to produce uniform results. The products nearest the source will sustain the full effect of the heat, those farthest remaining green or undone. With applicant's method, the diffusion of heat may be brought about regardless of the position of the combustion chamber or the temperature of the products leaving the chamber. This is accomplished by means including bypassing the products, diffusing them, using them partly for direct oven heating, partly for heating other media, and for recirculation.

A further object is to arrange a heating system so that products of combustion may not only be used to produce a drying action and induce circulation movements, but also enable oxidation to be accomplished if desired, by oxygen carrying media, such as air, at a proper temperature. In the drying or baking and finishing of enamelled or similarly treated products such as automobile fenders, metal furniture, and the like, it is customary to dry or bake the work after the finish is applied thereto by dipping, spraying, flowing, brushing, or in other manner. This process comprises several steps. Briefly, when the work is first introduced to the heated zone, the lighter volatiles of the enamel or other finishing material will flood off and the coating becomes thinner and lose weight. When the work has been advanced further in its course through the oven, the heavier volatiles leave and the residue takes on oxygen. The linoleic acid is changed to linoxem, and the coating polymerizes to a homogeneous mass. Oxygen, therefore, plays a part relatively as important as heat, but neither would alone bake the coating except very slowly.

A feature of the invention, therefore, resides in the provision of means for supplying heat and heated oxygen in various currents to enable speedy and efficient preheating, setting of the coating, and required oxidation, with a minimum of combustion and a maximum use of the products of combustion.

Another feature covers the arrangement of apparatus for regulating the various currents of gases in an oven whereby the accumulation of volatiles in the forward part of the oven is prevented and the condensation thereof to form fume marks on the work effectively avoided.

A further feature provides for reducing stack losses to a minimum and compensating for radiation losses by utilizing the products of combustion to heat an interchanger adapted to exhaust heated air counter-current to the incoming work.

Other features for variously routing air and products of combustion in combination with a combustion chamber and interchanger, and for locating the apparatus and fans to most efficiently and safely handle the gases, and for providing factors of economy and efficiency in initial installation, maintenance and replacement, will be apparent from the following description read in conjunction with the accompanying drawings, in which:

Figs. 6, 7, 8 and 9 represent various arrangements for routing and recirculating gases from a combustion chamber adapted to serve an oven or heating area.

Considering all the figures, similar designations referring to similar parts, numeral 10 represents an oven and 11 a cross bar bottom entry conveyor suitably arranged to proceed through the oven in the direction indicated. Combustion chamber 12 is suitably equipped with burning apparatus and in a preferable form is arranged as an oil fired burner. Various installations have been tried with gas fired burners as well as with electric heating means, but oil combustion has been found to be practically 100% efficient and supply a maximum of heat free from soot or sparks. In a co-pending application Serial No. 290,843, filed July 6, 1928, applicant is disclosing means for effectively preventing explosions or fire from sparks or lighted particles, no matter the combustion means employed. Though the danger from fire and explosion in the system herein described is very small, yet it is possible to provide against such contingency by the provision of these filters at inlet 13 and outlet 14 of the combustion chamber.

Figure 2:
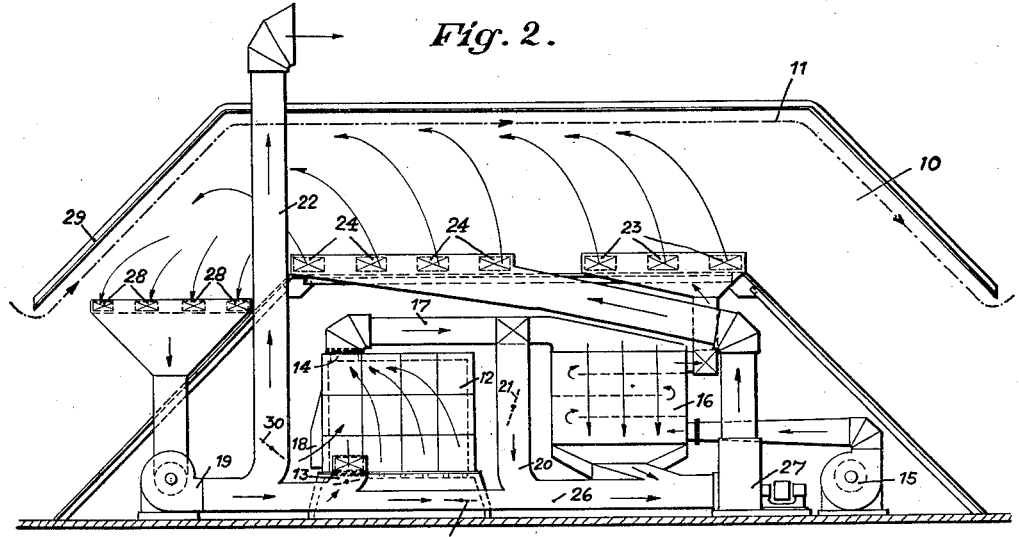
Fig. 2 illustrates one arrangement of combustion chamber, interchanger and auxiliary apparatus within a baking oven.
Figure 3:
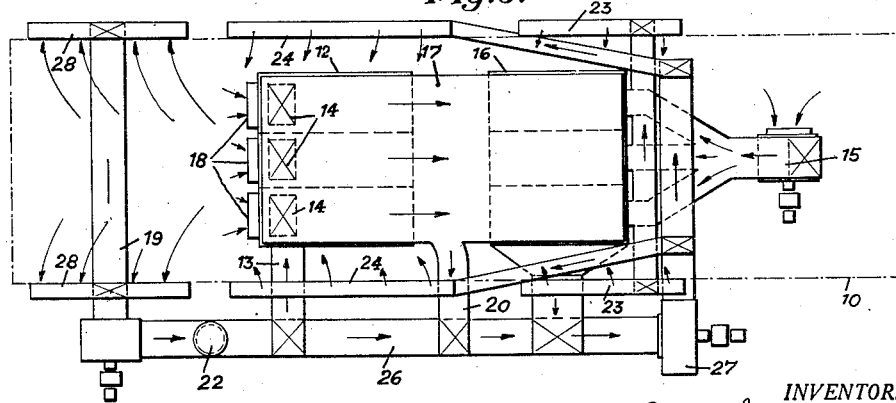
Fig. 3 is a plan view of the system illustrated in Fig. 2.

Considering more particularly Figs. 2 and 3, blower 15 supplies fresh air to interchanger 16 which may be of any suitable type. The interchanger is heated by products of combustion from chamber 12 which proceed through duct 17. The combustion chamber draws air from the room wherein it is located through intakes 18 and draws various products recirculated from the oven through duct 19. The combustion chamber routes part of the products of combustion to the interchanger, as illustrated, the remainder being bypassed around the interchanger through branch duct 20. The position of damper 21 will determine the volume of products of combustion bypassed. Stack 22 provides a relief for exhausting return products rerouted through duct 19, which are not returned to the combustion chamber. The air or oxygen stream is discharged to the oven through ducts 23 and the products of combustion which are fed from the combustion chamber and interchanger find ingress to the oven through discharge ports 24. It may be noted that the products of combustion and other gases returned through duct 19 may be recirculated back to the oven without proceeding through the combustion chamber or interchanger. By manipulating damper 25 as illustrated, the return gases will be pulled through duct 26 by induced draft fan 27 and discharged through ports 24.

In the operation of the system the work which has been dipped, sprayed or otherwise finished, will enter the oven on the conveyor and proceed upwardly therewithin. For purposes of draft control, the conveyor preferably inclines as illustrated so that return gases will enter return intake ports 28 before they can possibly escape under the lower level of the oven enclosure hood 29. The gases leaving the combustion chamber are naturally at the highest temperature in the system. Part of the gases will, however, proceed to the interchanger and hence lose considerable of their heat in raising the temperature of the fresh air fed to the interchanger by the fan 15. These gases, after heating the interchanger, will mix with the gases from the combustion chamber bypassed around the interchanger and will also be further tempered by the return gases from the oven shunted through return duct 26. As shown, this mixture of gases will be blown by induced draft fan 27 to the heating area of the oven to serve the forward end particularly. The fresh air will be heated by the interchanger to a maximum temperature, and establish a heating zone just short of the flashing point of the finishing material applied to the work. If, for example, a fender passing through the oven were finished with an enamel having a flashing or scoring point of about 525°, the fresh air would be discharged to maintain temperature of approximately 480°. As illustrated, the fresh air is discharged counter-current to the incoming work and thus also tends to drive the products of combustion toward the forward end of the oven. As the work enters the oven it will be heated by the combination of products of combustion, fresh air and recirculated products discharged through ducts 23 and 24. These products will be at a sufficiently high composite temperature to initially heat the work and flood off the lighter volatiles of the enamel or other finishing material. The coating will consequently lose weight. The further the work proceeds within the oven, the higher the temperature will come, inasmuch as the work will approach nearer and nearer to the discharge ducts. As the volatiles or gases flow off, the residue on the surface will naturally assume a thicker consistency and its adhesion to the work becomes greater due to an increase in viscosity. When the work reaches a temperature approaching the maximum under the flash point, the heavier volatiles will then start cracking, leaving the gum and oil to take on oxygen. When the work is carried to the point of maximum temperature, oxidation is in full swing and the baking process carried on with great rapidity. This continues until the work enters the outlet or downwardly inclining conditioning zone where the temperature gradually decreases wthout danger of excessively rapid cooling.

Inasmuch as the system can take care of only a certain volume of gases stack 22 serves as an exhaust for the increment of air intaken by the combustion chamber through intakes 18. Damper 30 in the stack effects a control for limiting the volume of air exhausted.

It is apparent that if fresh air alone were used to supply gases through ducts 24 as well as through ducts 23 that an amount of products of combustion would be necessary far greater than that utilized herein. By using the products of combustion to preheat and circulate gases within the oven, the initial stages of baking are effectively accomplished, while the necessary fresh air is simultaneously heated to supply the needed oxygen for the subsequent stages. Further, the routing of the products of combustion, as illustrated, serves to drive the gases through the oven counter to the direction of progress of conveyor 11, and this prevents the volatiles from collecting in the forward part of the oven.

If the volatiles were permitted to accumulate, they would naturally condense on the cooler surfaces of the entering work, with disastrous results to the finish due to forming fume marks on the enamel. The constant circulation of the return gases causes complete diffusion in the oven with ever changing currents proceeding from the rear toward the front. Fan 19 creates a suction through the intake ducts 28 whereas blowers 15 and 27 discharge to the interior.

Figure 1:
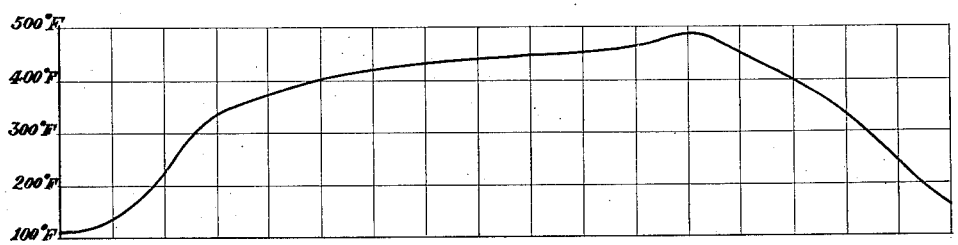
Fig. 1 illustrates graphically a typical range of temperatures in an oven, in which a baking process of dipped or sprayed work is adapted to be practiced.

The control of temperature is illustrated graphically in Fig. 1, wherein it is seen that the gases will, in a typical installation, where the flash point of the enamel used is 500° F., produce varying temperatures. Starting with 100° F. at the entrance point, the return gases quickly raise the temperature to 350° at about a point adjacent the return ports 28, and then raise it gradually up to 450° at the position above the combustion chamber, whereupon the maximum temperature in the oxidation area is maintained at about 480° until the baking is completed and the work enters the conditioning zone.

Figure 4:
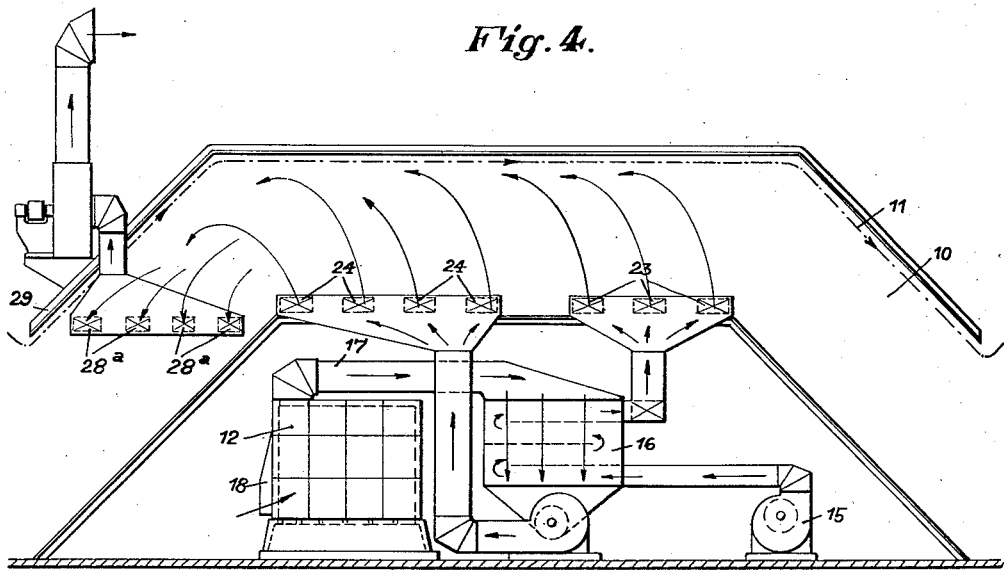
Fig. 4 illustrates a similar system in which the products of combustion are not recirculated.

In Fig. 4 the system is more simply illustrated and arranged without the provision of means for recirculating the products of combustion. In this system the products from ducts 23 and 24 will be exhausted through ducts 28ª to the atmosphere, as illustrated. A combustion chamber will, in this case, intake air from the room wherein located through intake 18 and will heat the interchanger in the same manner as in the system of Fig. 2. The products of combustion used for heating the interchanger will, however, be supplied to the oven for use in the baking process.

Figure 5:
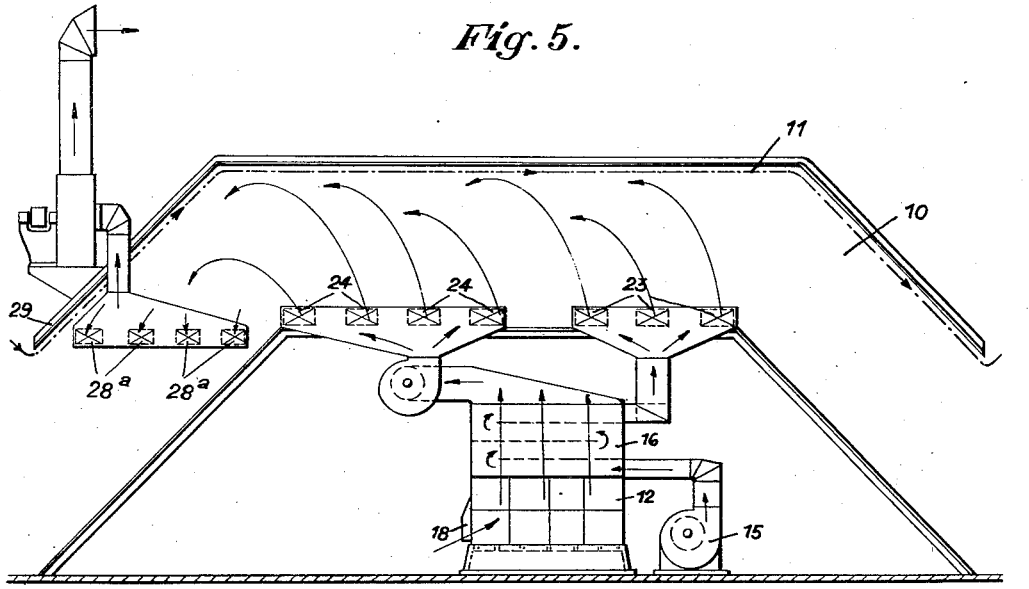
Fig. 5 represents a system similar to that of Fig. 4, in which the interchanger and combustion chamber are combined in a single unit.

In Fig. 5 another method of application is illustrated wherein the interchanger is superposed on the combustion chamber. The system is substantially the same in that the products of combustion from the chamber used for heating the interchanger are then fed to the oven to provide the first heating stage.

Various methods of routing gases to the oven from the combustion chamber may be improvised. Applicant, however, provides for utilizing the products of combustion so that if desired a substantially uniform temperature may be maintained in the oven, notwithstanding the recirculation of products of combustion directly or in conjunction with those from the heating chamber. For illustration purposes, Figs. 6, 7, 8 and 9 represent modifications of an arrangement for maintaining a core oven or the like at a temperature of 500° F. In Fig. 6 is illustrated the well known plan of heating a volume of air and ejecting it through an outlet 31 from the heater to the oven. The heat from the oven is spilled through a stack 32. In Fig. 2 the products from the heater are discharged by fan 33 to the oven, but instead of being entirely exhausted through stack 32 may be recirculated in combination with additional products from the heater. Damper 34 controls the relative proportions of products spilled and returned.

In Fig. 8 the products from the heater are similarly discharged to the oven but instead of being adapted to bypass the heater are sent directly to the heater for reheating and reuse. It is patent that this method of recirculation will effect a substantial saving in fuel inasmuch as the recirculated products are at comparatively high temperature and near the required maximum.

In Fig. 9, however, applicant has devised a system in which maximum utility may be had of the recirculated gases and an arrangement afforded wherein the fan is effectively heat insulated due to the routing of the gases, and thus prevented from burning out from maximum heat exposure. The products of combustion from the heater are routed through ducts 35 and 36 to a mixing chamber 37 served by ejector 38. The products of combustion after leaving the core oven may proceed to the heater for reuse or may bypass the heater for recirculation in combination with products from the heater. The bypassed products will proceed through outlet 31 and mix with the products from the heater, forming a mixture to be fed through the ejector to the oven. It may be noted that in this arrangement the fan apparatus is between the ducts from the heater, but may be variously positioned so that it is practically immune from the maximum heat discharged from the heater. It merely handles the bypassed recirculated products and thus may enjoy longer life and comparatively little maintenance expense. Any suitable damper device such as 39 may be provided to apportion the volume of products going to the heater and that bypassed around it. By this method an even temperature may be maintained at a minimum of expense and with assurance of uniform efficiency.

It is apparent, of course, that the system of distribution of the products of combustion in any of the arrangements herein outlined may be varied to suit the needs of engineering expediency. Applicant deems any arrangement of this class in which products of combustion are recirculated to produce varying temperature conditions or a uniform temperature condition in a heat treatment oven, to be within the purview hereof.

Since certain changes may be made in carrying out the invention and in practicing the principles thereof, without departing from the scope of the invention, it is intended that all matter contained in the above description or shown in the drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A method of heating consisting in providing a volume of products of combustion of desired temperature, using said products to raise a supply of air to a given temperature, circulating the products of combustion within a desired area, circulating the supply of air within another area and recirculating the products of combustion and air.

2. A method of heating consisting in providing a given volume of products of combustion, utilizing said products to directly treat work to be heated, utilizing said products to heat a given volume of air, utilizing said air free from products of combustion to oxidize work to be treated and reusing the products and air in desired volume.

3. A method of heating consisting in producing a volume of products of combustion at a given rate and temperature, utilizing said products, in part, to directly heat a given area, utilizing the remainder of said products to heat air supplied to said area, utilizing said air, in part, substantially free from products of combustion and directing the products of combustion and air within said area to maintain desired temperatures in different portions thereof.

4. A method of controlling the temperature within a given area, consisting in supplying products of combustion to said area and supplying air to said area heated by said products of combustion, said products of combustion and air being independently discharged to serve, initially, different portions of said area, and recirculating the air and products from said area to be reused, if desired, in the production of additional products and heated air.

5. A method of heating a given undivided area consisting in directing products of combustion to one portion of the area, utilizing said products to heat a gas used in another portion, and routing said gas within the area whereby the products will proceed within the area in a predetermined direction.

6. A method of maintaining a circulation system in a heating area consisting in drawing products from within the area to be utilized in producing products of combustion, discharging products of combustion directly to said area, utilizing products of combustion for heating auxiliary apparatus and directing gases from said auxiliary apparatus to function individually and then mingle with the products of combustion within said area and proceed toward one end thereof.

7. A method of controlling temperature in a heating zone consisting in discharging products of combustion directly within the zone, utilizing products to heat a gas to be discharged within the zone, discharging the products used for said heating within the zone, recirculating the mixture within the zone, to be used for producing products of combustion and for diluting products of combustion.

8. A method of maintaining desired temperature conditions within a heating area consisting in supplying a given quantity of products of combustion to the area and providing an additional quantity of products of combustion for heating air, discharging said air within a portion of the area comparatively free from products of combustion, contacting said products and air with work to be dried, recirculating the products, air and volatiles from the work throughout the system and exhausting a quantity of the mixture within the area from the system.

9. Means for controlling desired temperature conditions in an oven comprising a combustion chamber, an outlet from said combustion chamber to one portion of the oven, means for utilizing products from said combustion chamber for heating an interchanger, and means for supplying air to the interchanger and exhausting it within another portion of the oven.

10. In a system of the character described, a combustion chamber, an interchanger serving a heating zone, means for supplying products of combustion to heat said interchanger, and means for discharging other products of combustion directly within another heating zone.

11. In a system for maintaining desired temperatures in a heating area, means for conveying work to be heated through the area, means for introducing products of combustion to contact with the work, means for supplying fresh air substantially free from products of combustion heated by said products of combustion to contact with the work, and means for recirculating the products of combustion and air for reuse in heating operations.

12. In a system of the character described, a combustion chamber, an apparatus for heating air, means for discharging products of combustion to said apparatus and without the apparatus, means for controlling the course of the air from said apparatus to drive the products of combustion discharged without the apparatus in a direction counter to the progress of work to be treated by said products and air.

13. A combination of apparatus for maintaining desired temperature conditions in a given area comprising a combustion chamber for producing products of combustion, an apparatus for supplying fresh air to said area, the products of combustion being adapted to heat said apparatus and be discharged directly within the area, an exhaust for spilling products from the area without the system, and an intake for recirculating products from the system to said combustion chamber and around said combustion chamber for reuse in the heating area.

14. In a system of the character described, means for supplying products of combustion to one part of an undivided heating area, means for utilizing the products of combustion for heating a supply of fresh air discharged within another part of the area and routing the air so that oxidation may take place in part in an area wherein the products of combustion are discharged.

15. A system for maintaining desired temperature conditions throughout a given area comprising a combustion chamber, means for discharging products of combustion from the chamber within the area, means for recirculating said products to and around said combustion chamber, a fan for handling the by-passed products, the products from said combustion chamber being routed around and mixing with the by-passed products at the outlet of the fan.

16. In a system of the character described an oven, a conveyor adapted to proceed through the oven in a certain direction, a combustion chamber adapted to introduce products of combustion within the oven, means for using products of combustion for heating a supply of air discharged within another part of the oven, means for inducing a current within the oven whereby the air and products of combustion are driven counter to the direction of the conveyor through the oven, means for recirculating the products and air so driven, said current being adapted to drive products given off by work on the conveyor from within the oven to the recirculating means.

17. In a system of the character described, means for introducing products of combustion proximate to the entrance of an oven, means for feeding work within the oven to be treated by said products of combustion to allow volatile products to be given off, means for oxidizing surfaces on said work by heated air substantially free from products of combustion, and means for recirculating the products of combustion and volatiles given off by the work.

In testimony whereof I affix my signature.

BURT S. HARRISON.